C. C. HEISE.
DIRECTION SIGNALING APPARATUS FOR MOTOR VEHICLES.
APPLICATION FILED AUG. 18, 1920.
1,412,112.
Patented Apr. 11, 1922.
2 SHEETS—SHEET 1.
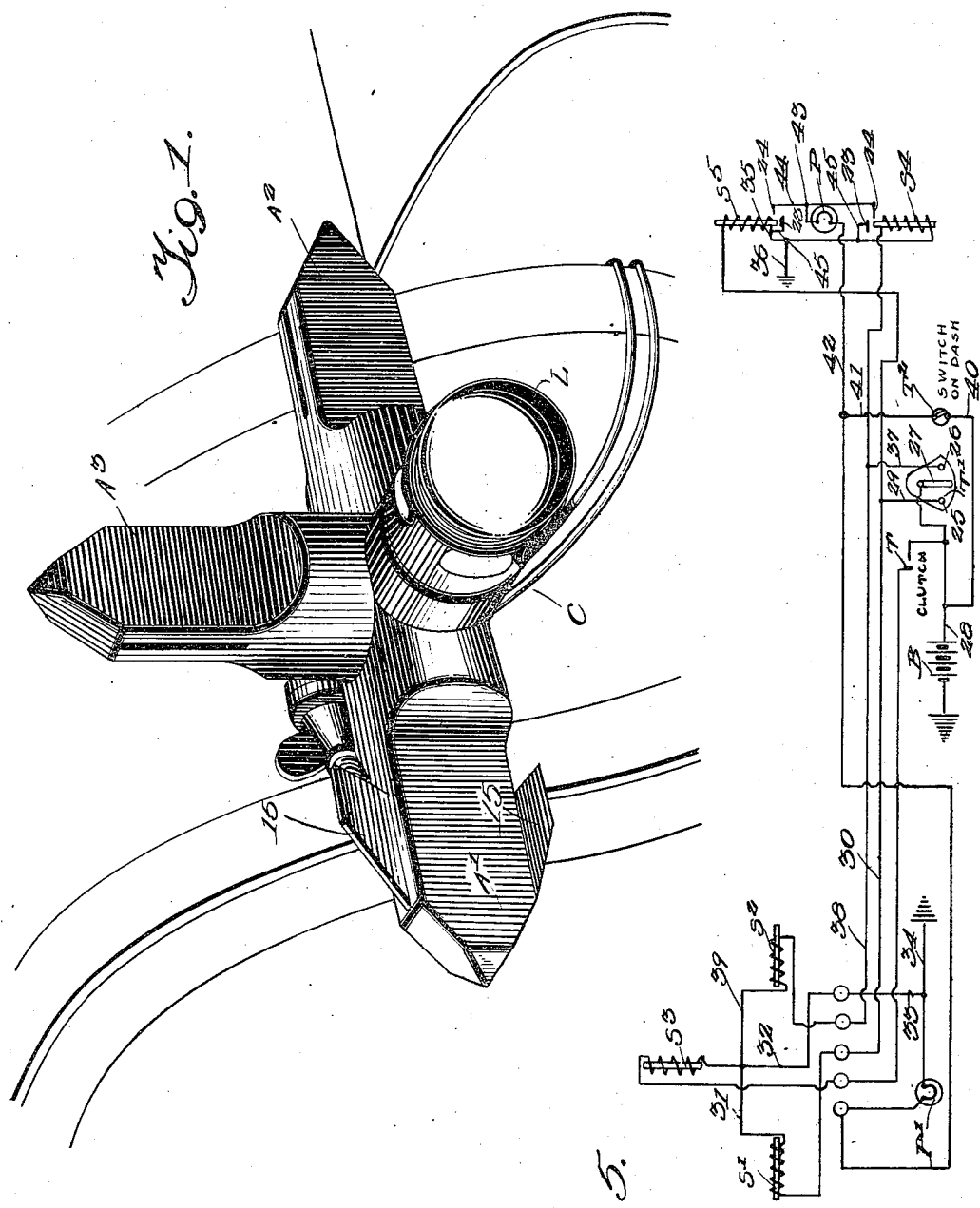
WITNESSES
INVENTOR
C. C. Heise,
BY
ATTORNEYS

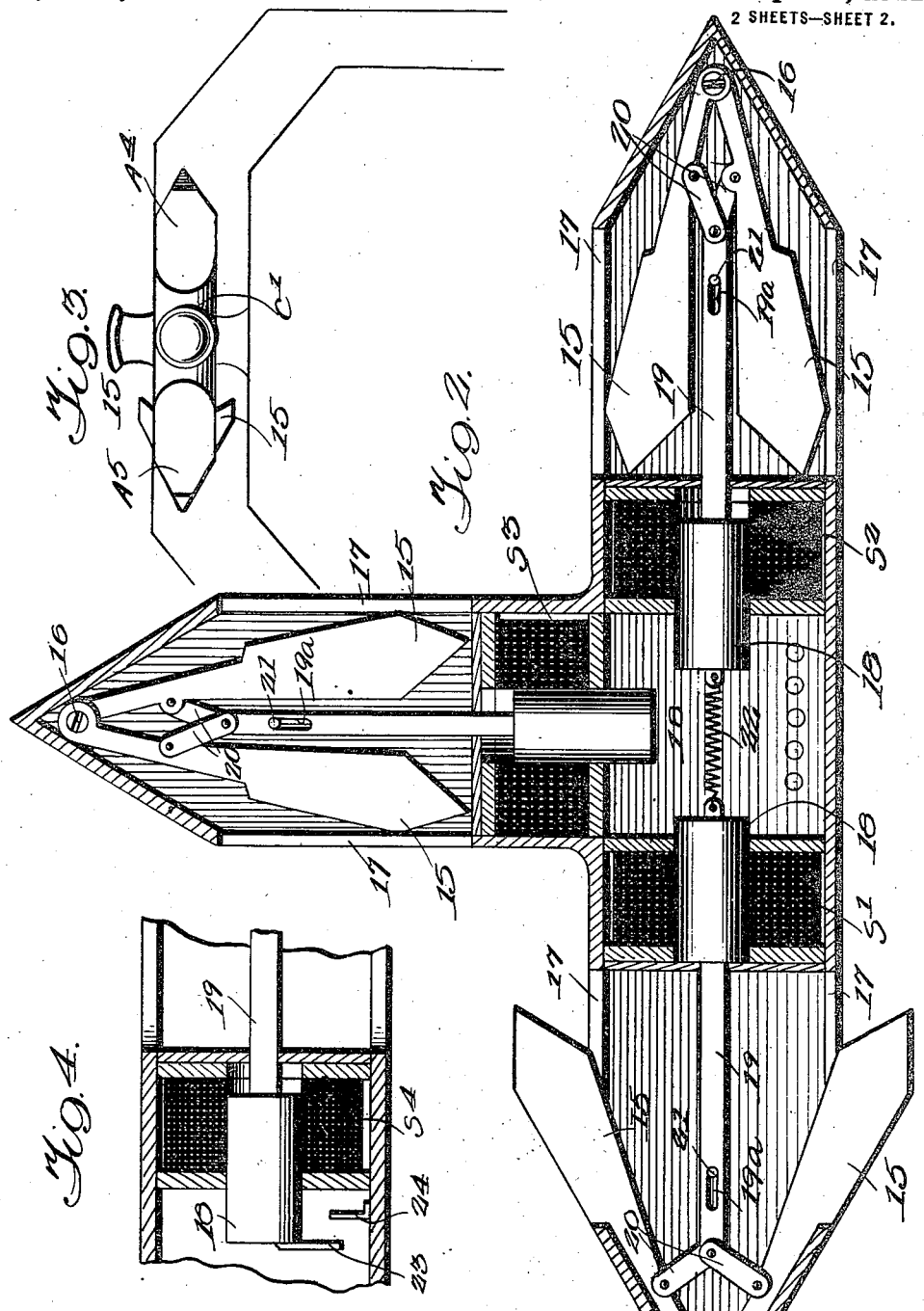

UNITED STATES PATENT OFFICE.

CARL CLAUSSEN HEISE, OF DECATUR, ILLINOIS.

DIRECTION-SIGNALING APPARATUS FOR MOTOR VEHICLES.

1,412,112.    Specification of Letters Patent.    Patented Apr. 11, 1922.

Application filed August 18, 1920. Serial No. 404,420.

*To all whom it may concern:*

Be it known that I, CARL CLAUSSEN HEISE, a citizen of the United States, and a resident of Decatur, in the county of Macon and State of Illinois, have invented certain new and useful Improvements in Direction-Signaling Apparatus for Motor Vehicles, of which the following is a specification.

My invention relates to signaling apparatus for motor vehicles for indicating the direction in which a vehicle is about to turn or the diminution of speed of the vehicle.

A purpose of my invention is the provision of a direction signaling apparatus of that character which includes arrows arranged at the front and rear of the vehicle having wings which are movable into and out of view, and which indicate when in view the direction in which the vehicle is about to turn or when coming to a full stop.

It is also a purpose of my invention to provide a direction signaling apparatus having magnetically operated means for actuating the wings of the arrows, lamps for illuminating the arrows, and circuits including the means and lamps which are manually controlled to effect the movement into view of the wings of a particular arrow.

I will describe one form of direction signaling apparatus embodying my invention and will then point out the novel features thereof in claims.

In the accompanying drawings:

Figure 1 is a view showing in perspective that part of the signaling apparatus arranged in the rear of a vehicle.

Figure 2 is a vertical longitudinal sectional view of the part of the apparatus shown in Figure 1.

Figure 3 is a view showing in front elevation that part of the apparatus arranged at the front of the vehicle.

Figure 4 is a fragmentary view showing a portion of the apparatus shown in Figure 3.

Figure 5 is a view showing diagrammatically the signaling apparatus and the circuits therefor and the manner in which such circuits are controlled.

Similar reference characters refer to similar parts in each of the several views.

My invention in its present embodiment consists of a rear signaling apparatus shown in Figures 1 and 2, and a front signaling apparatus shown in Figures 3 and 4. The rear signaling apparatus comprises three elongated bodies of arrow formation, and which I will hereinafter refer to as arrows, such bodies being formed of suitable metal and secured in fixed relation to each other. The arrows occupying the horizontal position are designated at $A'$ and $A^2$, respectively, the arrow $A'$ extending to the left as shown and being termed the left-hand arrow, while the other arrow $A^2$ extends to the right and is termed the right-hand arrow. The vertical arrow is designated at $A^3$ and is designed to indicate the stop.

Any one arrow $A'$, $A^2$ or $A^3$ is provided with movable wings 15 which as illustrated to advantage in Figure 2 are pivoted at common points as indicated at 16 to permit of outward or inward swinging movement through slots 17 formed in the opposite sides of the arrow body. The wings 15 are adapted to be moved outwardly to the position shown in Figure 1 or inwardly to the position shown in Figure 2 by means of a solenoid, the solenoid for the wings of the arrow $A'$ being designated at $S'$, and the solenoid for the wings of the arrow $A^2$ being designated at $S^2$. The solenoid for the wings of the arrow $A^3$ is designated at $S^3$. In either instance, the solenoid $S'$, $S^2$, etc. are secured within the arrow body with the core or armature 18 thereof being operatively connected to a corresponding pair of wings 15 by means of a rod 19 and links 20. The rod 19 is slotted as indicated at $19^a$, and in this slot a pin 21 works for limiting the longitudinal movement of the rods. The cores of the solenoids $S'$ and $S^2$ are normally biased toward each other as shown in Figure 2 by means of a coiled contractile spring 22 which is connected to the confronting ends of the cores in the manner shown. The core of the solenoid $S^3$ normally occupies a lowered position under the action of gravity, and with the cores in the normal position all of the wings 15 are folded into the bodies of the arrows so as to be hidden therefrom. However, when the solenoids are energized the cores 18 are moved in the direction of the wing thus forcing the rods 19 inwardly and effecting an outward swinging movement of the wings about the point 16 as a center so that they extend outwardly at opposite sides of the arrow body in the manner shown in Figures 1 and 2. In this indicating position of the arrows they cooperate with the arrow body so as to simulate an arrow, as will be understood.

By referring to Figure 1, it will be seen that the several arrows are provided at their meeting ends with a rearwardly extending casing C having its rear end closed by a lens L. Within the casing C is an incandescent lamp which when illuminated projects its rays through suitable openings formed in the casing and onto all of the arrows A', A² and A³ so that when any pair of wings 15 of any one arrow are in indicating position an operator of the vehicle in the rear can readily determine the intention of the operator of the vehicle upon which the signal is carried.

Referring now to Figures 3 and 4, the front signaling apparatus is identical in construction to the rear signaling apparatus with the exception that the vertical arrow A³ is omitted, the left-hand arrow being designated at A⁴ and the right-hand arrow at A⁵. The solenoids of the arrows A⁴ and A⁵ are designated at S⁴ and S⁵, respectively, their cores 18 carrying movable contacts 23 which in the normal position of the cores disengage stationary contacts 24 secured to the arrow body. However, when the solenoids are energized to effect movement of their cores, the movable contacts 23 are adapted to engage the stationary contacts 24 and to thereby complete certain circuits which will be described in connection with the diagrammatic showing of the apparatus in Figure 5.

Referring now to Figure 5, I have here shown diagrammatically one form of circuits and controllers embodying the signaling apparatus just described whereby an actuation of the several arrows of the front and rear signals can be effected by the operator of a motor vehicle. In the present instance I have provided a switch T adapted for controlling the supply of current from a battery B to the solenoid S³ for actuating the arrow A³. This switch T is adapted to be associated with the clutch of a motor vehicle in such manner as to be closed or opened when the clutch is in the engaging position so that it is automatically operable with the actuation of the clutch.

I further provide a manually operable switch T' which includes a pair of stationary contacts 25 and 26 and a movable contact 27 that is adapted to engage either of the stationary contacts. This switch T' controls the supply of current from the battery B to the solenoids S', S², S⁴ and S⁵ in such manner that the solenoids S' and S⁵ are simultaneously energized and the solenoids S² and S⁴ simultaneously de-energized or vice versa according as the movable contact engages the contact 25 or 26.

The switch T² also serves to control the supply of current to the lamps within the casings C and C' of the front and rear signals, the contacts 23 and 24 also controlling the supply of current to the lamps of the rear signal. The lamp for the rear signal is designated at P' and the lamp for the front signal is designated at P.

The operation of the signaling apparatus is as follows:

When it is desired to signal the fact that the operator of a vehicle is about to turn to the left, the movable contact 27 of the switch D' is moved to engage the stationary contact 25 thereby completing the following circuit: from the positive side of battery B through wire 28, contacts 27 and 25, wires 29 and 30, winding of solenoids S', wires 31, 32, 33 and 34 to ground, the opposite side of the battery being grounded as clearly shown. The completion of this circuit effects an energization of the solenoid S' thereby causing the wings of arrow A' to move into indicating position, thus indicating at the rear of the vehicle that it is the intention of the operator to turn to the left. Simultaneously with the closing of that circuit, another circuit is completed for energizing the solenoids S⁵ to move the wings of the arrow A⁵ into indicating position and to thereby signal to any one in the front of the vehicle that it is the intention of the operator to turn to the left. This circuit is as follows: from battery B through switch T', wire 30, winding of solenoid S⁵, wires 35 and 36 to ground.

When it is desired to indicate that the vehicle is about to turn to the right, the movable contact 27 is moved to engage the stationary contact 26 thus completing the following circuit: from the positive side of battery B through wire 28, contacts 27 and 26, wires 37 and 38, winding of solenoid S², wires 39, 32, 33 and 34 to ground. The completion of this circuit effects an energization of solenoid S² thereby moving the wings of the arrow A² into indicating position and thus indicating at the rear of the vehicle that it is about to turn to the right. With the completion of that circuit another circuit is completed which energizes the solenoid S⁴ and thus moves the wings of the arrow A⁴ into indicating position so as to signal at the front of the vehicle that the vehicle is about to turn to the right. This circuit is as follows: from wire 38 through winding of solenoid S⁴, wires 35 and 36 to ground.

When actuating the signal to indicate the diminution in speed or the bringing of the vehicle to a full stop, the switch T is closed to complete the circuits of the solenoid S³ thus moving the wings of the arrow A³ into indicating position. It is believed unnecessary to trace this circuit as it is perfectly obvious from a consideration of Figure 5.

The operation of the signaling apparatus as just described is as used in the day. However, at night in order to render the signal visible, an illumination of the lamps P and P' is necessary. This illumination of the lamps is effected in the following manner:

The switch T² is closed thus completing the circuit for the lamp P' and mantaining such circuit closed during all stops in the operation of the apparatus. The closing of the switch T² completes a portion of the circuit for the lamp P but the remainder of this circuit is controlled and adapted to be closed by the contacts 23 and 24. For example, when the contact 27 of the switch T' engages the contact 26 to effect an energization of the solenoid S⁴, the contact 23 carried by the core 18 of this solenoid is moved into engagement with the corresponding contact 24 thereby effecting an illumination of the lamp P through the following circuit: from positive side of battery B through wires 28 and 40, switch T², wires 41 and 42, lamp P, wires 43 and 44, contacts 24 and 25, wires 45, 35 and 36 to ground. From this circuit it will be seen that the lamp P is energized as long as the solenoid S⁴ is energized and that when the solenoid is de-energized the contact 23 moves out of engagement with the contact 24 thereby disrupting the circuit and extinguishing the lamp P. The completion of the circuit of the lamp P when the solenoid S⁵ is energized is similar to that described in connection with the energization of the solenoid S⁴.

Although I have herein shown and described only one form of direction signaling apparatus embodying my invention, it is to be understood that various changes and modifications may be made herein without departing from the spirit of the invention and the spirit and scope of the appended claims.

What I claim is:

1. A direction signaling apparatus comprising a stationary arrow, and wings movable into and out of the said arrow.

2. A direction signalling apparatus comprising an arrow including a stationary body and a pair of wings movable into and out of the body, and electro-magnetic means for moving the wings into and out of the body.

3. A direction signalling apparatus comprising an arrow including a stationary body and a pair of wings movable into and out of the body, and a solenoid having its core operatively connected to the wings to effect actuation of the latter.

4. A direction signaling apparatus comprising a stationary arrow having slots formed therein, a pair of wings divided at a common point within the arrow and movable through said slots, a solenoid within the arrow, a rod connected to the core of the solenoid and having a slot formed therein, a pin fixed to the arrow and extending through said slot, and links operatively connecting said rod with said wings.

CARL CLAUSSEN HEISE.